(12) United States Patent
Achaerandio Fernández et al.

(10) Patent No.: US 11,990,861 B2
(45) Date of Patent: May 21, 2024

(54) HORIZONTAL SOLAR TRACKER

(71) Applicant: KTRSolar Tech, S.L., Sarriguren (ES)

(72) Inventors: Álvaro Achaerandio Fernández, Sarriguren (ES); Andrés Jiménez De La Cruz, Sarriguren (ES); Francisco Serrano Piris, Sarriguren (ES)

(73) Assignee: KTRSolar Tech, S.L. (ES)

( * ) Notice: Subject to any disclaimer, the term of this patent is extended or adjusted under 35 U.S.C. 154(b) by 208 days.

(21) Appl. No.: 17/771,469

(22) PCT Filed: Oct. 22, 2020

(86) PCT No.: PCT/ES2020/070641
§ 371 (c)(1),
(2) Date: Apr. 24, 2022

(87) PCT Pub. No.: WO2021/079020
PCT Pub. Date: Apr. 29, 2021

(65) Prior Publication Data
US 2022/0376650 A1    Nov. 24, 2022

(30) Foreign Application Priority Data
Oct. 25, 2019 (ES) ............... ES201930944

(51) Int. Cl.
*H02S 20/32* (2014.01)
(52) U.S. Cl.
CPC .................... *H02S 20/32* (2014.12)
(58) Field of Classification Search
CPC ................ H02S 20/30; H02S 20/32
See application file for complete search history.

(56) References Cited

U.S. PATENT DOCUMENTS

2019/0068112 A1* 2/2019 Gnanapa ............... F16M 11/18

FOREIGN PATENT DOCUMENTS

| EP | 2431683 | 3/2012 |
|----|---------|--------|
| ES | 1068473 | 10/2008 |

(Continued)

OTHER PUBLICATIONS

Informe de Busqueda Internacional [International Search Report] and the Written Opinion dated Mar. 1, 2021 From the International Searching Authority Re. Application No. PCT/ES2020/070641 and Its Translation of Search Report and Written Opinion. (12 Pages).

*Primary Examiner* — Daniel P Malley, Jr.
(74) *Attorney, Agent, or Firm* — MASCHOFF BRENNAN

(57) ABSTRACT

A horizontal solar tracker (1) with a configuration that ensures the transmission of the turning movement generated by the drive element to the rotating beam and to the connecting rod-crank mechanism, prevents possible breaks and weaknesses in the joining areas, and is easy to transport. It comprises at least one front rotating beam (3) and at least one rear rotating beam (12) that can turn, joined by means of a connecting rod-crank mechanism (4). A drive assembly (2) generates the turning movement in a mobile element (22). The front rotating beam (3) has a first joining sector (31) that can be coupled to the mobile element (22) and the connecting rod-crank mechanism (4) comprises a tubular portion (42) that clasps the rotating beam (3) and a second joining sector (43) that can be coupled to the mobile element (22).

12 Claims, 3 Drawing Sheets

(56) References Cited

FOREIGN PATENT DOCUMENTS

| ES | 2368402 | 11/2011 |
|----|---------|---------|
| WO | WO 2009/096754 | 8/2009 |
| WO | WO 2015/051267 | 4/2015 |

* cited by examiner

HORIZONTAL SOLAR TRACKER

RELATED APPLICATIONS

This application is a National Phase of PCT Patent Application No. PCT/ES2020/070641 having International filing date of Oct. 22, 2020, which claims the benefit of priority of Spanish Patent Application No. P201930944 filed on Oct. 25, 2019. The contents of the above applications are all incorporated by reference as if fully set forth herein in their entirety.

FIELD AND BACKGROUND OF THE INVENTION

The present invention relates to a horizontal solar tracker intended to orient solar panels positioned in at least two rows, wherein a drive element generates a rotating movement on at least one front rotating beam linked to solar panels and on a connecting rod-crank mechanism, which transmits the rotating movement to at least one rear rotating beam, linked to other solar panels, orienting them along a horizontal axis.

More particularly, the invention is a solar tracker with a configuration that ensures the transmission of the turning movement generated by the drive element to the rotating beam and to the connecting rod-crank mechanism, prevents possible breaks and weakening in the joining areas, and is easy to transport.

Solar trackers are known in the state of the art which allow solar panels to be rotated by orienting the position thereof as a function of the path of the sun, pivoting around a horizontal north-south axis. The trend in the architecture of this type of installation is to have two rows of parallel solar panels, which are joined by a connecting rod-crank mechanism.

The turning movement is generated by a drive element, normally by means of a motor, located in the first row of solar panels or independent of the rows. A rotating beam which transmits the turning movement to the solar panels of the first row is joined to this drive device. To transmit the turning movement from the first row to the second row, transmission beams or arms which are joined to both rows are used. The type of joining that is used to join the arms to the front rotating beam is a clamp, which clasps the transmission beam, with an upper part that is fixed to the rest of the transmission beam by means of mechanical joining elements.

The problem associated with this type of joining is that due to the repetitive turning movements and the incidence of the wind that the clamps have to withstand, these clamps may have a high tendency to deform and deteriorate.

In this regard, the clamp solution makes it so that the mechanical energy corresponding to two semi-rows of solar panel panels travels through the torsional beam section from the clamp to the drive device, and it may have a stress concentration.

Moreover, both the front rotating beam and the clamps and joining elements thereof have manufacturing tolerances and this clearance window can cause the clamp to exceed its elastic limit and shear or deform when it is tightened.

SUMMARY OF THE INVENTION

The present invention aims to solve some of the problems mentioned in the state of the art.

More specifically, the present invention relates to a horizontal solar tracker, which comprises at least one front rotating beam and at least one rear rotating beam that can turn, joined by means of a connecting rod-crank mechanism. The solar tracker further comprises a drive assembly, which in turn comprises a fixed support, a body fixed to the support, at least one mobile element that can move with respect to the body, on which one of the front rotating beams is coupled and a motor adjacent to the body that generates a movement on the mobile element.

The connecting rod-crank mechanism comprises a first transmission section associated with the rear rotating beam and at least one second transmission section comprising an arm associated with the front rotating beam. One end of the front rotating beam has a first joining sector that can be coupled to the mobile element. The second transmission section additionally comprises a tubular portion joined orthogonally to the arm that clasps the rotating beam in an assembly situation, and it also comprises a second joining sector linked to one end of the tubular portion, which can be coupled to the first joining sector and to the mobile element.

Thus, in the assembly of the tracker, the front rotating beam is inserted through the tubular portion of the connecting rod-crank mechanism so that the tubular portion partially clasps the rotating beam. Once inserted, the first joining sector and the second joining sector are coupled to the mobile element. The drive assembly may comprise a motor of the rotary type or one of the linear type. The movement generated by the motor on the mobile element is preferably a turning movement allowing the mobile element or at least some of the parts thereof to rotate with respect to the body.

In an assembly situation, transmission of the turning movement directly from the mobile element to the front rotating beam and to the connecting rod-crank mechanism is achieved, minimising the transmission losses of the mechanical load. The connecting rod-crank mechanism, by being linked to the rear rotating beam by means of a first transmission section, transmits the turning movement to the rear rotating beam.

Preferably, the first joining sector is a first flange and the second joining sector is a second flange and the first joining sector is retained between the mobile element and the second joining sector. The flanges enable the coupling of the sectors to the mobile element to be greater, since the surface that the beams have in contact with the mobile body is high. The first flange may comprise first holes, the second flange may comprise second holes and the mobile element may comprise housings, wherein the housings are configured to face the first holes and the second holes in an assembly situation. Thus, in an assembly situation, the holes are coaxial therebetween and with respect to the housings, being able to insert joining means through these holes to the housings, for example, screws.

The joining of the first joining sector and the second joining sector with the mobile element can alternatively be by means of inserting the joining sectors into a cavity of the mobile element, such that the front rotating beam and the tubular portion are retained in the mobile element. In another example, the first joining sector and the second joining sector may have a shape complementary to the mobile element so as to reinforce the joining therebetween, the joining sectors being disc-shaped and the cavity having a cylindrical shape.

In this way, mechanical energy due to the wind, from the row that does not contain the drive device, reaches it directly without having to pass through the front rotating beam.

Preferably, the tubular portion can be a single piece that clasps the front rotating beam without the need for additional mechanical joining elements so that possible breaks are minimised, the rotating beam being threaded in the tubular portion.

Between the tubular position and the rotating beam there may be a small clearance which makes it possible to insert the rotating beam into the tubular portion. Alternatively, the tubular portion can comprise two sectors, a sector that clasps the beam at a lower area and an upper sector that clasps the beam at an upper area, such that joining elements are necessary to link both sectors and the sectors can have second through cavities into which said joining elements are inserted. The arm can be joined to at least one sector by welding or by additional joining elements.

Preferably, the mobile element can be a tubular element that can comprise two ends and at least one of the ends thereof can comprise a crown that can have a rotating movement together with the mobile element with respect to the body. Crown is understood to be the side sectors that limit the mobile element on either side and can be linked to one of the joining sectors in an assembly situation, when the joining sectors are preferably flanges. Thus, the movement generated by the motor on the mobile element is a rotating movement, which makes the crown and consequently the connecting rod-crank mechanism and the front rotating beam turn, since the crown is joined thereto. This configuration is especially advantageous when the drive assembly behaves like a rotary actuator and the joining sectors are flanges, the first joining sector and the second joining sector being preferably joined to said crown.

Additionally, the mobile element can be located at a distance from the outside of the body in the direction of the front rotating beam in an assembly situation greater than the sum of the thickness of the first joining sector and the second joining sector, such that the first joining sector and the second joining sector are completely located inside the body in an assembly situation. Thus, the joining sectors are housed inside the body, protecting the joining.

Alternatively, the mobile element can comprise at least one profiled beam and a transmission sector, linked and with the possibility of movement therebetween. As with linear actuators, the transmission sector can be an element to which the motor transmits a movement and this motor, being able to turn, in turn transmits this movement to the beam that is coupled to the joining sectors such that it generates a turning movement on them. The beam can be alternately flat and not profiled.

Alternatively, the internal transverse cross-section of the tubular portion may have dimensions slightly larger than the transverse cross-section of the front rotating beam and they may have complementary shapes.

The mobile element can extend passing through the entire fixed body and can have two front rotating beams, each one associated with each side of the mobile body, and it can also have two first transmission sections. Thus, the movement generated by the motor element is transmitted to an additional front rotating beam, such that it extends the range of the turning movement and the transmission of mechanical energy to the rear rotating beam is reinforced through the first additional transmission section.

The front rotating beam and the transmission beam can be made of a metal material. The material must be suitable for withstanding the mechanical stresses to which the beams are subjected. Additionally, the connecting rod-crank mechanism may comprise reinforcements that extend from the arm to the tubular portion, reinforcing the tubular portion so that it is not damaged by the mechanical stresses.

BRIEF DESCRIPTION OF THE SEVERAL VIEWS OF THE DRAWINGS

As a complement to the description provided herein, and for the purpose of helping to make the features of the invention more readily understandable, in accordance with a preferred practical exemplary embodiment thereof, said description is accompanied by a set of drawings constituting an integral part of the same, which by way of illustration and not limitation, represent the following.

DESCRIPTION OF SPECIFIC EMBODIMENTS OF THE INVENTION

Figure 1:
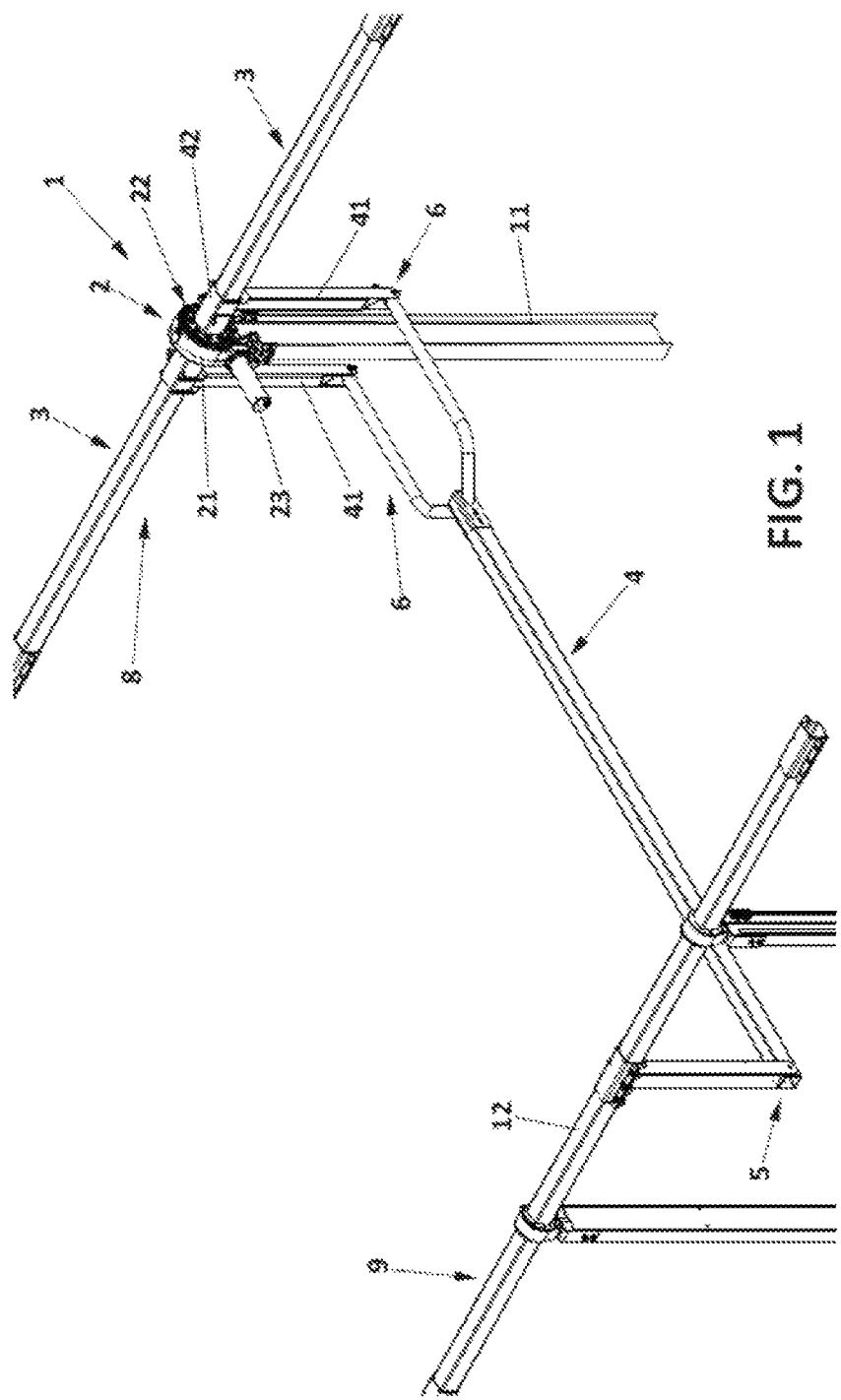
FIG. 1 shows a perspective view of a first embodiment of a horizontal tracker in an assembly situation.

FIG. 1 shows a perspective view of a first embodiment of a solar tracker (1) intended to orient solar panels distributed in two rows (8,9), with a first row (8) and a second row (9). The solar tracker (1) is equipped with a drive assembly (2), two front rotating beams (3) in the first row (8) responsible for transmitting the turning movement to solar panels joined thereto and a connecting rod-crank mechanism (4) associated with them and responsible for transmitting the turning movement to a rear rotating beam (12) of the second row (9).

Preferably, the drive assembly (2) comprises a body (21) fixed to a support (11) comprising a mobile element (22) which in the embodiment shown extends through the inside the entire body, partially passing through it, and a motor (23) that generates a turning movement on the mobile element (22).

As mentioned, the front rotating beams (3) are responsible for transmitting the turning movement to the solar panels joined thereto, not shown in the figure, and each of them is associated with the mobile element (22). The element responsible for transmitting the turning movement of the first row (8) to the second row (9) of the solar tracker is the connecting rod-crank mechanism (4), also associated with the rear rotating beam (12) as well as with the front rotating beam (3).

The connecting rod-crank mechanism (4) comprises a first transmission section (5), associated with the rear rotating beam (12) and two second transmission sections (6), wherein each one comprises an arm (41) associated with the front rotating beam (3) and a tubular portion (42) orthogonally joined to the arm (41) that clasps the front rotating beam (3). In this first embodiment, two front rotating beams (3) and two second transmission sections (6) are on each side of the mobile element. The rotating beams (3,12) are also supported by support pillars that have a turning support that allows them to turn, not shown in the figures.

Figure 2:
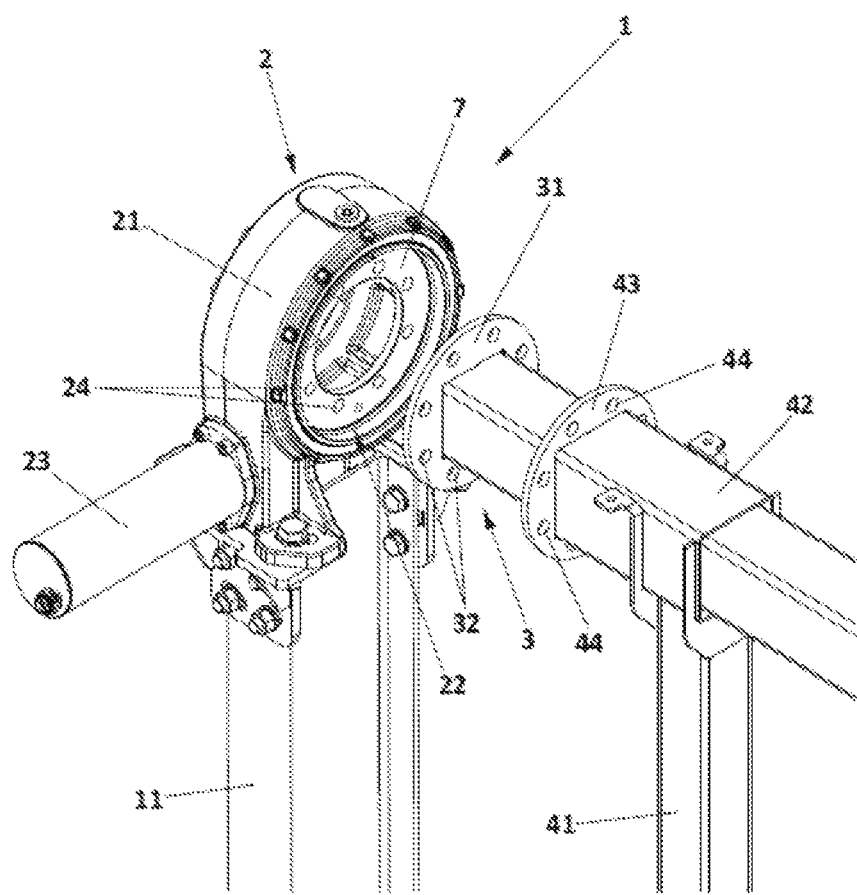
FIG. 2 shows a perspective view of a second embodiment of a solar tracker in an intermediate assembly situation.

FIG. 2 shows a perspective view of a second embodiment of a horizontal solar tracker (1) in an intermediate assembly situation. The solar tracker (1) comprises a mobile element (22) that extends inside the body (21) to the vicinity of one of the sides of the body (21) and the mobile element (22) is equipped with a single crown (7) at one end. The mobile element (22) is a cylindrical piece housed inside the body (21) and preferably comprises a crown (7) which is a sector that extends on each side of the mobile element (22) in a direction perpendicular to the front rotating beam (3). The motor (23) is adjacent to the body (21) protected by a casing and joined to a worm screw that makes the mobile element (22) linked to the crowns (7) turn, not shown in the figures. A front transmission beam (3) and a single second transmission section (6) can also be seen.

As shown, one end of the front rotating beam (3) has a first joining sector (31) that can be coupled to the crown (7) of the joining element (22) of the drive assembly (2), such that it turns integrally with the crown (7) of the joining element (22) in an assembly situation.

The second transmission section (6) comprises a second joining sector (43) linked to one end of the tubular portion (42), which can be coupled to the first joining sector (31) and to the crown (7). The first joining sector (31) and the second joining sector (43) have a shape complementary to the crown (7) and are preferably a first flange and a second flange. In an embodiment not shown in the figures, the mobile element (22) has a cavity in a shape complementary to the beams, in which both the first joining sector (31) and a second joining sector (43) are inserted and coupled such that they turn integrally with the mobile element (22).

Thus, in an assembly situation, the front rotating beam (3) is threaded in the tubular section (42). The front rotating beam (3) is inserted into the tubular portion (42) from the side of the second joining sector (43), leaving the tubular portion (42) partially clasping the front rotating beam (3).

The tubular portion (42) has a hole with a transverse cross-section of dimensions slightly larger than the front rotating beam (3). Transverse is understood as a plane orthogonal to the front rotating beam (3) in an assembly situation. The transverse cross-section of the front rotating beam (3) has a square shape in the embodiment shown. In another embodiment, the shape can be circular or polygonal or a combination of both.

Additionally, the crown (7) has housings (24), the first joining sector (31) has first holes (32) and the second joining sector (43) has second holes (44), placed coaxially and intended to house joining elements, not shown in the figure.

Figure 3:
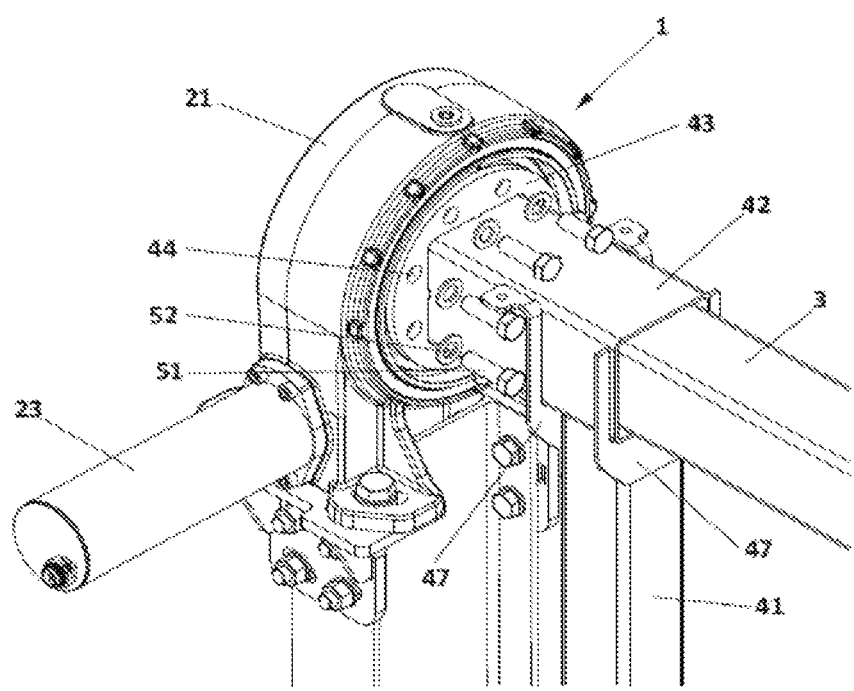
FIG. 3 shows a detailed view of a second embodiment of a solar tracker in an assembly situation.

FIG. 3 shows a detailed view of a second embodiment of the solar tracker (1) in an assembly situation. The joining elements, for example, screws (51) adjusted by washers (52), are inserted into the holes (32, 44) and into the housings (24). Alternatively, the manner of joining the rotating beam (3) and the tubular sector (42) is by welding, subsequently joining them to the crown (7). In an assembly situation, the mobile element (22), the first joining sector (31) and the tubular sector (42) are coupled and turn integrally.

FIG. 3 shows that the mobile element (22) housed inside the body (21) of the drive assembly (2) is located at a distance from the outside of the body (21), forming a cavity, such that by coupling the first joining sector (31) and the second joining sector (43), they are protected within the cavity. The first joining sector (31) and the second joining sector (43) have a shape complementary to the crown (7) and are preferably a first flange and a second flange. In another embodiment, the mobile element (22) protrudes from the body (21) in the direction of the front rotating beam (3). The connecting rod-crank mechanism (4) comprises reinforcements (47) that extend from the arm (41) towards the tubular portion (42).

What is claimed is:

1. A horizontal solar tracker (1), comprising at least one front rotating beam (3) and at least one rear rotating beam (12) that can turn, joined by means of a connecting rod-crank mechanism (4), wherein the solar tracker (1) comprises:
    a drive assembly (2), which in turn comprises:
        a fixed support (11),
        a body (21) fixed to the support (11),
        at least one mobile element (22) that can move with respect to the body (21) on which at least one of the front rotating beams (3) is coupled,
        a motor (23) adjacent to the body (21) that generates a movement on the mobile element (22),
    wherein the connecting rod-crank mechanism (4) comprises a first transmission section (5) associated with the rear rotating beam (12) and at least one second transmission section (6) comprising an arm (41) associated with the front rotating beam (3),
    characterised in that:
        one end of the front rotating beam (3) has a first joining sector (31) that can be coupled to the mobile element (22), and in that
        the second transmission section (6) additionally comprises a tubular portion (42) joined orthogonally to the arm (41) that clasps the rotating beam (3) in an assembly situation, and it also comprises a second joining sector (43) linked to one end of the tubular portion (42), which can be coupled to the first joining sector (31) and to the mobile element (22).

2. The solar tracker (1) of claim 1, wherein the first joining sector (31) is a first flange and the second joining sector (43) is a second flange.

3. The solar tracker (1) of claim 2, wherein the first flange (31) comprises first holes (32), the second flange (43) comprises second holes (44) and the mobile element (22) comprises housings (24), wherein the housings (24) are configured to face the first holes (32) and the second holes (44) in an assembly situation.

4. The solar tracker (1) of claim 1, wherein the body (21) has a cavity with a cylindrical tubular shape and the mobile element has a cylindrical shape such that the mobile element can have a rotating movement inside the body.

5. The solar tracker (1) of claim 4, wherein the mobile element (22) partially passes through the body (21) such that it can be accessed from both sides of the body (21), and it also has two front rotating beams (3), each one associated with one end of the mobile element (22), and it also has two second transmission sections (6), each one associated with each mobile element (22).

6. The solar tracker (1) of claim 4, wherein the mobile element (22) is located at a distance from the outside of the body (21) in the direction of the front rotating beam (3) in an assembly situation greater than that sum of the thickness of the first joining sector (31) and the second joining sector (43), such that the joining sectors (31,43) are located inside the body (21) in an assembly situation.

7. The solar tracker (1) of claim 1, wherein the first joining sector (31) and the second joining sector (43) have a shape complementary to the mobile element (22).

8. The solar tracker (1) of claim 1, wherein the internal transverse cross-section of the tubular portion (42) has dimensions slightly larger than the transverse cross-section of the front rotating beam (3) and both have complementary shapes.

9. The solar tracker (1) of claim 1, wherein the front rotating beam (3) and the transmission beam (4) are made of a metal material.

10. The solar tracker (1) of claim 1, wherein the connecting rod-crank mechanism (4) comprises reinforcements (47) that extend from the arm (41) towards the tubular portion (42).

11. The solar tracker (1) of claim 1, wherein the tubular portion (42) is a single piece.

12. The solar tracker (1) of claim 1, wherein the mobile element (22) has a cylindrical shape and comprises at least one crown (7) at one of the ends thereof.

\* \* \* \* \*